(12) United States Patent  (10) Patent No.: US 7,108,331 B2
Hurwitz  (45) Date of Patent: *Sep. 19, 2006

(54) GENERATION OF IN-LINE SKATES AND SKATE-BOARDS WITH SAFETY "EDGING FRICTION CONTROL™"

(76) Inventor: Myron Stuart Hurwitz, 4420 Forest Glen Ct., Annandale, VA (US) 22003

( * ) Notice: Subject to any disclaimer, the term of this patent is extended or adjusted under 35 U.S.C. 154(b) by 0 days.

This patent is subject to a terminal disclaimer.

(21) Appl. No.: 11/043,189

(22) Filed: Jan. 27, 2005

(65) Prior Publication Data

US 2005/0146100 A1    Jul. 7, 2005

Related U.S. Application Data

(60) Continuation-in-part of application No. 10/462,631, filed on Jun. 17, 2003, now Pat. No. 6,848,750, and a division of application No. 09/782,079, filed on Feb. 14, 2001, now Pat. No. 6,637,827.

(60) Provisional application No. 60/564,217, filed on Apr. 22, 2004, provisional application No. 60/194,013, filed on Apr. 3, 2000, provisional application No. 60/185,496, filed on Feb. 28, 2000.

(51) Int. Cl.
*B60B 9/00* (2006.01)
*A63C 17/22* (2006.01)

(52) U.S. Cl. ............................. 301/5.301; 301/5.304; 152/40; 152/87

(58) Field of Classification Search ............ 301/5.301, 301/5.304, 5.305, 5.7; 152/17, 40, 87; 384/495, 384/496, 497, 498; 280/11.221, 11.223, 280/11.226, 11.204, 11.207, 11.208, 11.224; 188/29, 68, 74

See application file for complete search history.

(56) References Cited

U.S. PATENT DOCUMENTS

| 1,009,586 | A |   | 11/1911 | Schmidt |
| 1,430,319 | A |   | 9/1922 | Parker |
| 1,851,561 | A | * | 3/1932 | Baninger ............... 384/536 |
| 2,141,122 | A | * | 12/1938 | Boden ................. 384/582 |
| 2,266,042 | A | * | 12/1941 | Hufferd et al. ......... 16/223 |
| 2,467,437 | A | * | 4/1949 | Martinec .............. 301/5.7 |
| 2,670,242 | A | * | 2/1954 | Manfrid ............... 301/5.7 |
| 2,689,769 | A |   | 9/1954 | Ware, Jr. |
| 2,935,357 | A |   | 5/1960 | Sutowski |
| 3,224,821 | A |   | 12/1965 | Barr |

(Continued)

*Primary Examiner*—Russell D. Stormer

(57) ABSTRACT

The invention discloses a technology to safely control speed and brake on in-line skates using a ski-like technique, wherein in-line skate wheels can rotate both vertically and at an angle. When angled (or "canted") the wheels contact a friction strip within the wheel frame or a friction disk on the axle. The friction caused by the angled wheels contacting friction strips or friction disks is comparable to the canted "edging friction control" action of skis. The novel means that allows both vertical and angular rotation is a cohesive 2-element plastic hub shown in FIG's 1–C & D. The inner element 2a has a convex perimeter and fits inside outer element 2's convex bore, allowing 2a to rotate freely within outer element 2. Within inner element 2a are axle bearings 5 or 9 and axle 8. External elastomer springs 7a or internal elastomer spring 7b keep each wheel in a vertical coasting position. When in the canting (edging) position for control and braking, the self-aligning "springs" (7a or 7b) force the canted wheels back into the vertical coasting (gliding) position. Since the self-aligning elastomer "springs" can be made soft to hard and be interchangeably arranged, the skates can effectively have models that would satisfy a beginner to a pro.

31 Claims, 6 Drawing Sheets

U.S. PATENT DOCUMENTS

| | | |
|---|---|---|
| 4,706,974 A | 11/1987 | Vincent |
| 4,909,523 A | 3/1990 | Olson |
| 5,192,088 A | 3/1993 | Yu |
| 5,192,099 A | 3/1993 | Riutta |
| 5,199,727 A | 4/1993 | Lai |
| 5,397,138 A | 3/1995 | Mangelsdorf |
| 5,401,037 A | 3/1995 | O'Donnell et al. |
| 5,403,021 A | 4/1995 | Shifrin |
| 5,470,086 A | 11/1995 | Peterson et al. |
| 5,486,011 A | 1/1996 | Nelson |
| 5,527,100 A | 6/1996 | O'Donnell et al. |
| 5,549,393 A * | 8/1996 | Morando ............... 384/203 |
| 5,551,711 A | 9/1996 | Mangelsdorf |
| 5,560,685 A | 10/1996 | De Bortoli |
| 5,564,790 A | 10/1996 | Lekavich |
| 5,609,346 A | 3/1997 | Bellehumeur |
| 5,657,999 A | 8/1997 | Beaulieu |
| 5,667,280 A | 9/1997 | Hansen |
| 5,813,678 A | 9/1998 | Robins |
| 5,823,634 A | 10/1998 | Pozzobon |
| 5,873,583 A | 2/1999 | Moore |
| 5,938,214 A | 8/1999 | Roman et al. |
| 5,951,027 A | 9/1999 | Oyen et al. |
| 5,997,015 A | 12/1999 | Bellehumeur |
| 6,010,136 A | 1/2000 | Hoskin |
| 6,019,378 A | 2/2000 | Cushing |
| 6,065,760 A | 5/2000 | Weygandt |
| 6,217,038 B1 | 4/2001 | Moe |
| 6,325,544 B1 * | 12/2001 | Sasaki et al. ............... 384/192 |
| 6,561,591 B1 * | 5/2003 | Zimet .................... 301/5.1 |
| 6,637,827 B1 * | 10/2003 | Hurwitz ................. 301/5.301 |
| 6,848,750 B1 * | 2/2005 | Hurwitz ................. 301/5.301 |

\* cited by examiner

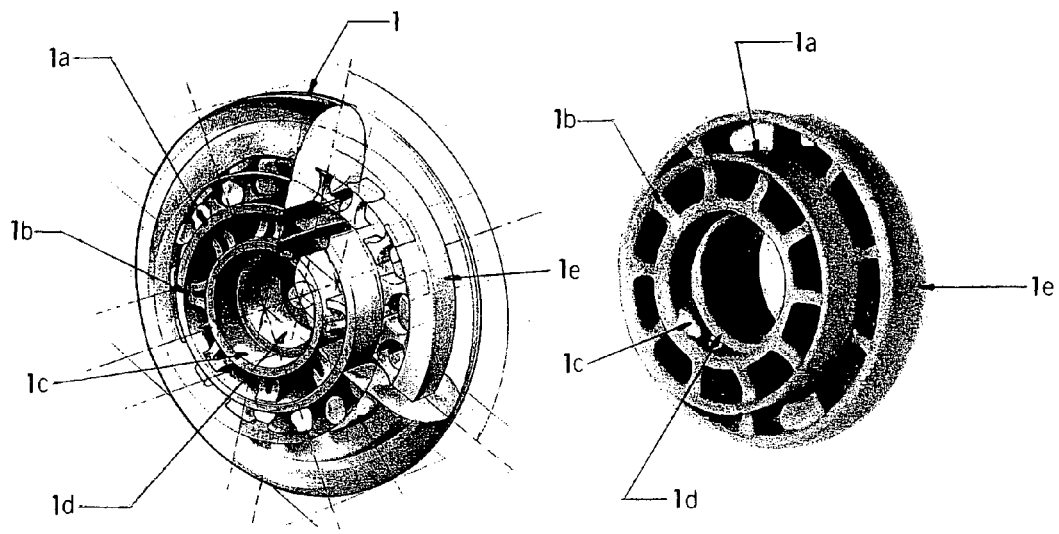
FIG. 1A
(PRIOR ART)
FIG. 1B
(PRIOR ART)
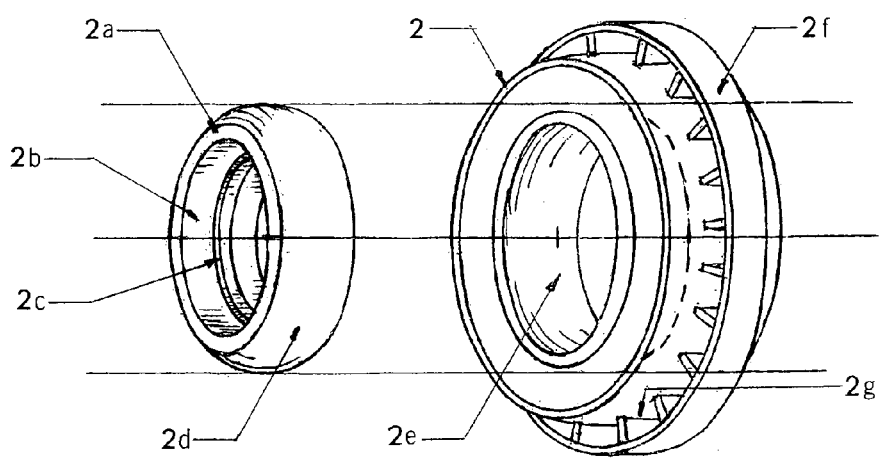
FIG. 1C  FIG. 1D

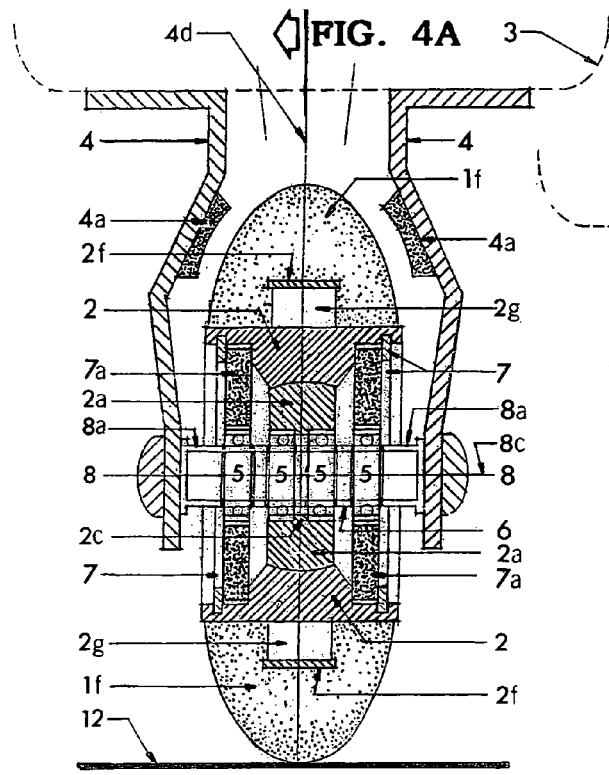
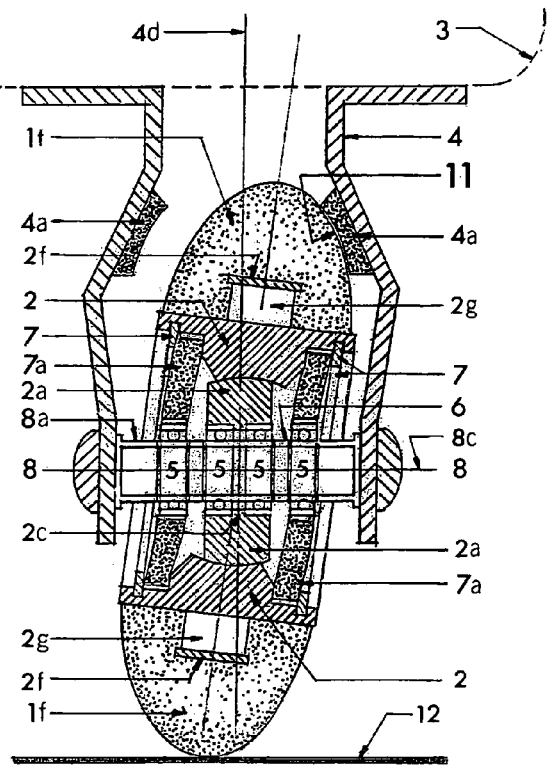
FIG. 2A
FIG. 2B
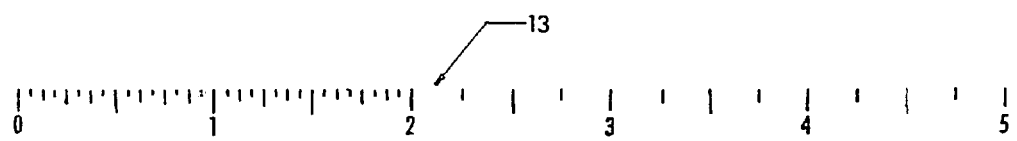

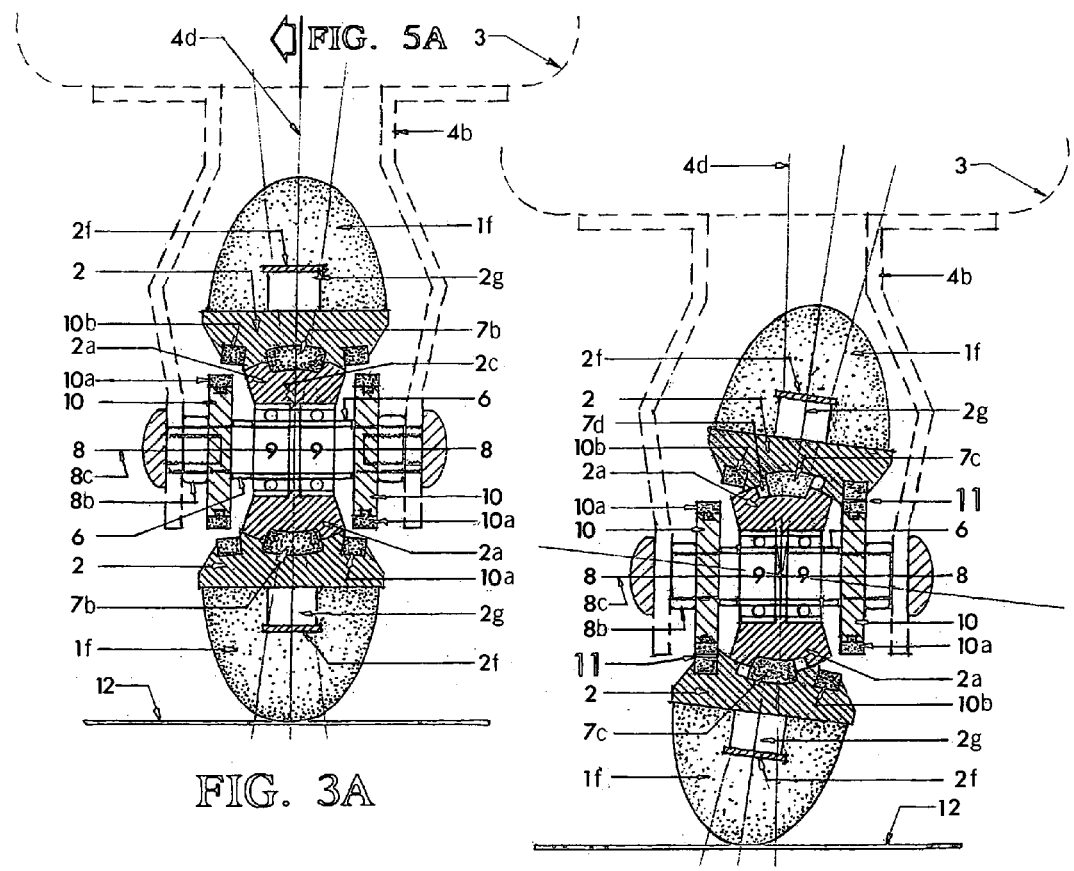
FIG. 3A
FIG. 3B
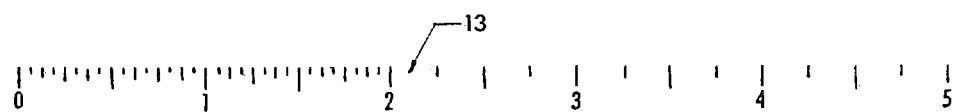

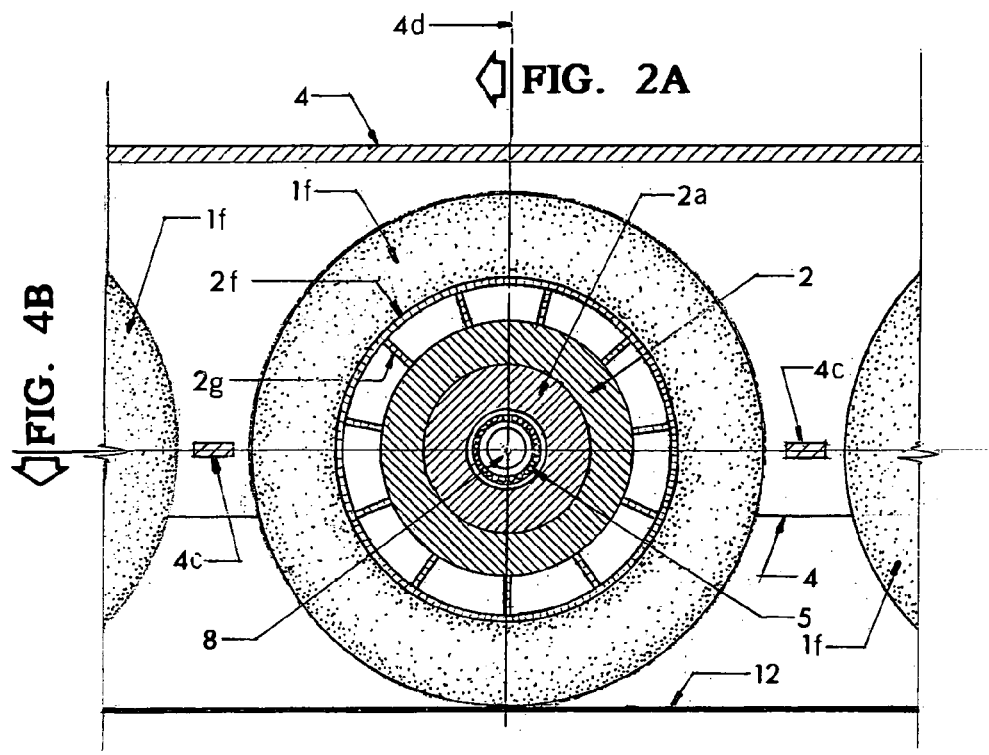
FIG. 4A
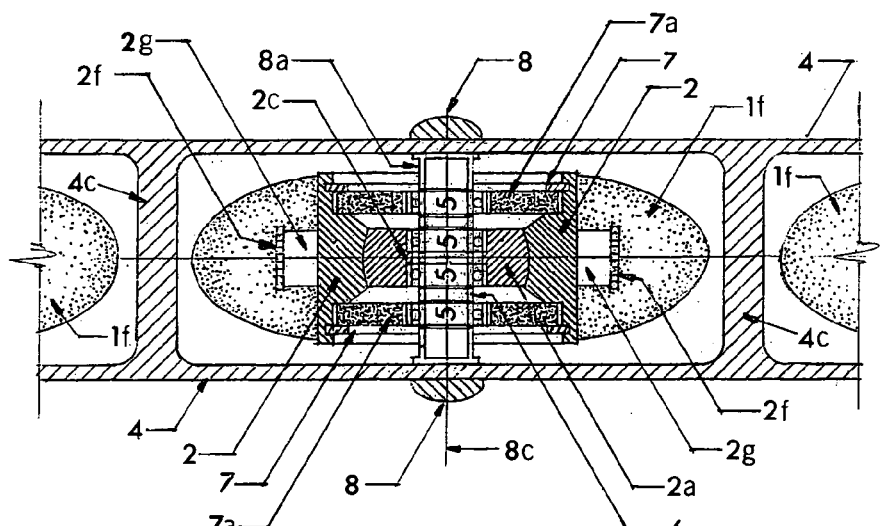
FIG. 4B
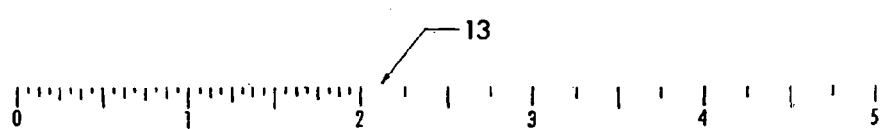

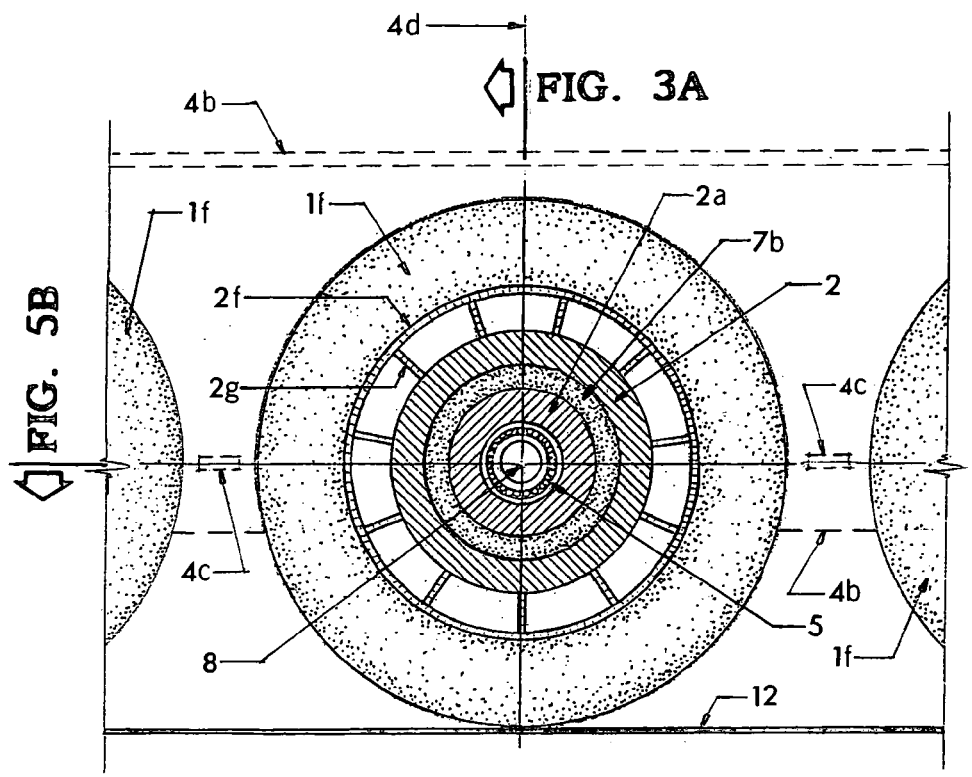
FIG. 5A
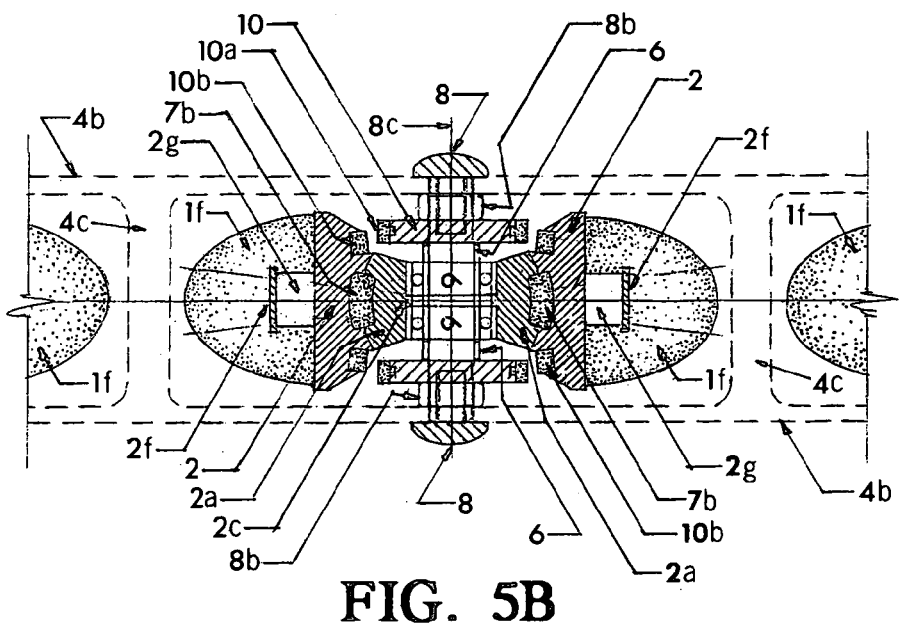
FIG. 5B
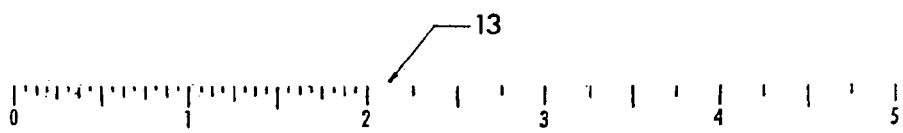

GENERATION OF IN-LINE SKATES AND SKATE-BOARDS WITH SAFETY "EDGING FRICTION CONTROL™"

This application claims the benefit of U.S. Provisional Application No. 60/564,217, filed Apr. 22, 2004, and this application is a continuation in part of U.S. application Ser. No. 10/462,631, filed Jun. 17, 2003, now U.S. Pat. No. 6,848,750B2, a division of U.S. application Ser. No. 09/782,079, filed 14, 2001, now U.S. Pat. No. 6,637,827B2, which is based on U.S. Provisional Application No. 60/194,013, filed on Apr. 3, 200 and Provisional Application No. 60/185,496, filed on Feb. 28, 2000, all of these applications being incorporated herein by reference for all purposes.

BACKGROUND OF INVENTION

1. Field of Invention

This invention relates to in-line skates, specifically to improve safety and performance by providing the mechanical means to control speed and to abruptly stop in a form and manner that is comparably used in skiing.

2. Status of Prior Art

The state of the art method of control and braking on in-line skates (since the inception of the sport (about 25 years ago), has been a heel brake pad on the right or left skate. To engage the heel brake pad (as one is moving forward out of control), the skater has to lean back, extend one leg forward and lift the toe of that skate to apply rear pressure to the heel brake pad.

This ungainly, unbalanced, one leg and skate method of control and braking is not only ineffectual, it more often than not causes the skater to fall with injurious results. For that reason, most in-line skaters do not use or attempt to use the heel brake pad. That lack of control has resulted in a high percentage of injuries, casting a noticeable pall over the sport in the last 5 or so years.

The present invention is an improvement to earlier U.S. Pat. No. 6,637,827 B2, the contents of which is hereby incorporated into this application.

SUMMARY OF INVENTION

In the earlier patent the in-line skate wheel is indicated as being somewhat parabolic in shape based upon known stock sized axle bearings, minimal width dimensions.

However, in anticipation of building prototype skates and recognizing the financial inability of acquiring parabolic shaped wheels, further investigation brought to light previously unknown manufacturers that made precision stock sized narrow width bearings. This enabled the use of non parabolic state of the art wheels for the prototype skates.

In the development of the prototype skates (as shown and described in the referenced patent) the smallest stock sized spherical bearing was used to create the novel two element dynamic hub of an in-line skate wheel. It was further recognized in the referenced patent, that in production the typical steel or metal alloy spherical bearing could be made out of plastic (see referenced patent, column 4, lines 30–34 and column 8, lines 10–12).

It soon became apparent that a spherical bearing as a distinct novel entity within the hub of an in-line skate wheel was not needed. Instead, there could simply be an inner "ring" hub element with a convex perimeter that would be within the concave bore of the outer hub element. As such the two homogeneous elements would in effect be a unified spherical bearing structure manufactured as an elastomer or metal product.

Further, because metal coil and rubberized accordion pleated springs were too expensive to fabricate for the prototype skates, the "self-aligning springs" evolved into cost saving radial urethane "springs" (cast with a ring at its core and a ring at its perimeter). It soon became apparent as well that urethane, in addition to it being an indefatigable material with a wide temperature range, its durometer ratings from soft to hard were practically limitless. That reality also comparably applied to the metal coil and rubberized accordion pleated springs originally envisioned.

In addition, because of the prototype cost saving advantage of using urethane as a "spring" material (aside from the equally feasible coil wire or rubberized accordion pleated spring), its application to the "self-contained wheel assembly" variation solution would be significant. That variation solution relies on a self-aligning ring structured spring concentrically located within and between the inner and outer spherical bearing hub elements. Considering urethane as an additional choice for that spring structured ring member (versus the coil or accordion pleated spring) enhances the optimum spring resolution of that variation solution for a Second Generation featured ski-like "edging friction control" safety in-line skate.

Finally, since the inception of in-line skates (about 25 years ago) the primary difference between inexpensive and expensive in-line skates has been their overall quality: boots; wheel frame; wheels; and, axle bearings (ABEC rating). However, regardless of quality all in-line skates lack an effective speed and braking control capability. As such, it is equally easy to sustain an injury on expensive as well as inexpensive in-line skates.

In stark contrast, this invention not only provides a novel simplified means to effectively and safely control speed and brake (comparable to the friction edging method used by skiers), but in addition this invention inherently allows a gradation of models (irrespective of cost range) that would specifically satisfy the capabilities of a beginner, an intermediate or a pro.

This inherent novel feature is based on the very essence of how the speed and braking control concept works—by self-aligning wheel springs, whose opposing tension and compressive forces can be varied incrementally from soft to hard. As such, it would now be possible to produce in-line skate wheels with soft to hard self-aligning springs in any 4–5 wheel customized combination, in categories that would be based on the weight and ability of the in-line skater (as is comparably done e.g. with skis, tennis rackets, golf clubs, etc.).

Having described the improved embodiments of the invention, including comparisons made to the existing state of the art; the following illustrations graphic scaled details and reference numbers will assist in additional explanations and clarifications of the improved embodiments, features and advantages of the invention.

BRIEF DESCRIPTION OF THE DRAWINGS

FIG. 1A is a combined translucent and sectional perspective view illustrating the component parts of a typical state of the art in-line skate wheel.

FIG. 1B is an isolated illustration of just the typical state of the art single element hard plastic in-line skate wheel hub as partially indicated in FIG. 1A.

FIG. 1C is a perspective view in accordance with the invention of the inner hard plastic element of a dynamic 2-element in-line skate wheel hub.

FIG. 1D is a perspective view in accordance with the invention of the outer hard plastic element of, the inventive dynamic 2-element in-line skate wheel hub.

FIG. 2A is a cross section view in accordance with the invention's wheel to frame variation solution (with the wheel in a vertical coasting position) using a dynamic 2-element hub that is configured to function as a spherical bearing structure wherein: the inner hub element's core houses axle bearings; the outer hub element secures radial urethane self-aligning springs (each having an axle bearing at their core); and, an interactive skate wheel frame that is configured to have contact friction strips within each inside surface of the frame.

FIG. 2B is the same cross section view of FIG. 2A, except that the wheel is displayed at an angle in contact with the friction strip within the wheel frame in an edging control position, simulating an EDGING FRICTION CONTROLS™ function common to skiing;

FIG. 3A is a cross section view in accordance with the invention's self-contained wheel assembly solution (in a coasting position), using a dynamic 2-element hub that is configured to function as a spherical bearing structure; wherein the self-aligning spring is embodied within and between the Outer and Inner dynamic 2-Element Hub; and, wherein EDGING FRICTION CONTROL™ locations are totally achieved by the self-contained wheel assembly components.

FIG. 3B is the same cross section view of FIG. 3A, except that the wheel is displayed at an angle (in an edging control position), wherein the radial friction strip on each side of the outer hub element are in simultaneous contact with each radial friction strip perimeter of the stationary axle disks (on each side of the wheel), simulating an EDGING FRICTION CONTROL™ function common to skiing;

FIG. 4A is a vertical cross section view of FIG. 2A.

FIG. 4B is a plan cross section view of FIG. 4A.

FIG. 5A is a vertical cross section view of FIG. 3A.

FIG. 5B is al plan cross section view of FIG. 5A.

DEFINITION OF ALL REFERENCE NUMERALS INDICATED IN DRAWINGS

Figure 6:
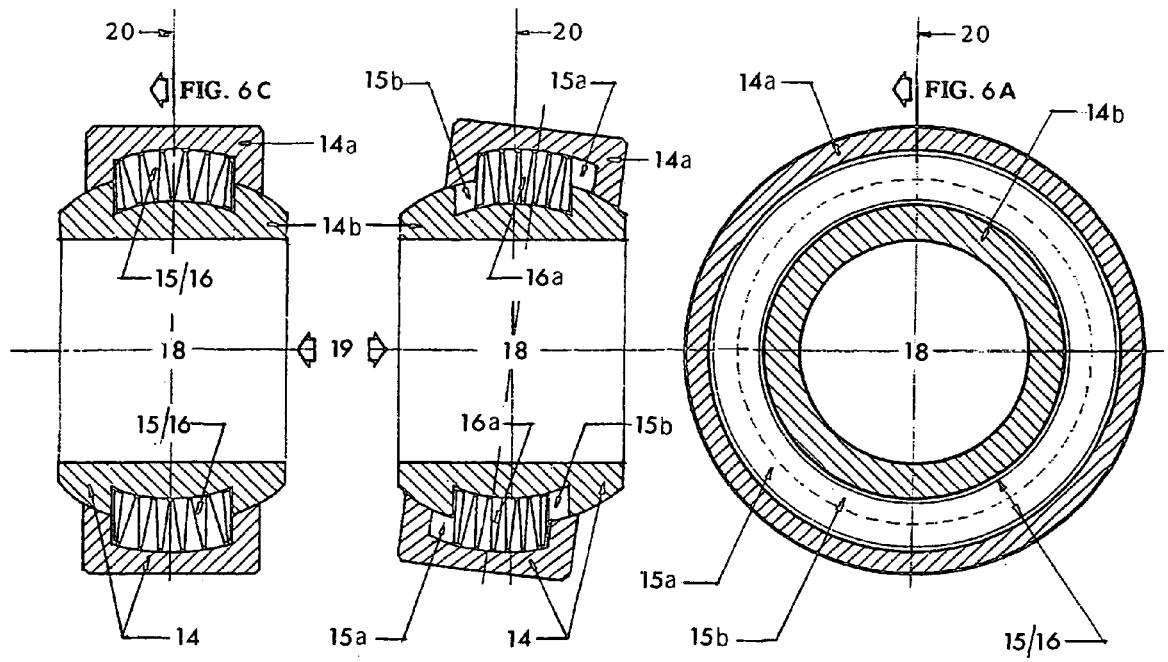
FIG. 6A is a cross section view of a novel spherical bearing in accordance with the invention that has an Integral Self-Aligning Spring in a minimal compression dynamic force state.
FIG. 6B is the same cross section view of FIG. 6A, except that the outer and inner elements of the spherical bearing are in a canted misaligned and maximum compression dynamic force state.
FIG. 6C is a longitudinal section view of FIG. 6A.
FIG. 6D is a perspective view in accordance with the invention of a self-lubricated accordion pleated sheet alloy or elastomer compression Self-Aligning Spring as shown in FIGS. 6A & 6B.
FIG. 6E is a perspective view in accordance with the invention of a self-lubricated wire or elastomer coil compression Self-Aligning Spring as similarly shown in FIGS. 6A & 6B.
Figure 6:
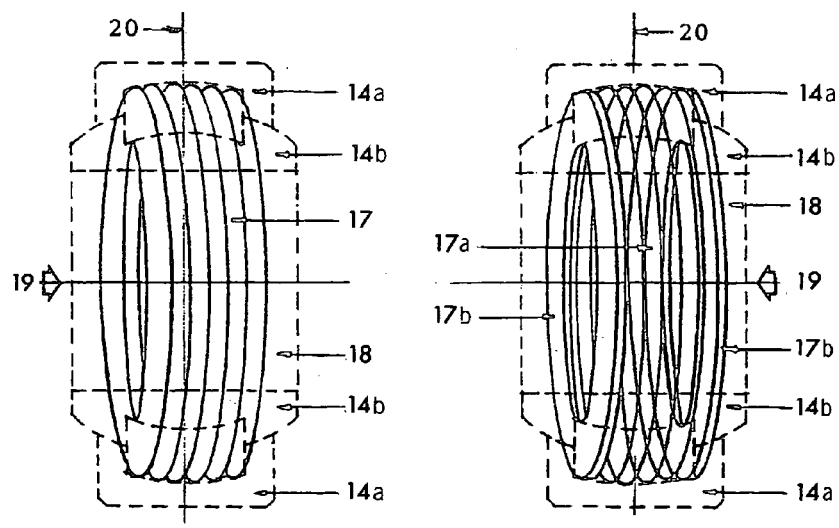

1. A typical prior art in-line skate wheel with a standard type hard plastic monolithic fixed hub, having a urethane In-Line Skate Tire.
1a. A typical prior art hard plastic, monolithic Wheel Hub.
1b. Prior art Wheel Hub Spokes.
1c. Core of prior art monolithic Wheel Hub that typically houses two axle bearings.
1d. Raised Core Section Spacer centered between Axle Bearings.
1e. Prior art Wheel Hub Reinforcing Rim for urethane Tire.
1f. An in-line skate wheel with a novel dynamic 2-Element hard plastic Hub, having a urethane (or comparable elastomer material) tire.
2. Outer hard plastic Element of inventive, dynamic 2-Element In-Line Skate Wheel Hub.
2a. Inner hard plastic Element of inventive, dynamic 2-Element In-Line Skate Wheel Hub.
2b. Core of Inner Element's dynamic 2-element In-Line. Skate Wheel Hub that houses axle bearings.
2c. Raised Core Section Spacer centered between Axle Bearings.
2d. Convex perimeter surface of Inner Hub Element of dynamic 2-element In-Line Skate Wheel Hub.
2e. Concave Core of Outer Hub Element of dynamic 2-Element In-Line Skate Wheel Hub.
2f. Tire Reinforcing Ring around perimeter of outer dynamic 2-Element In-Line Skate Wheel Hub.
2g. Spokes that support Tire Reinforcing Ring to outer perimeter of dynamic 2-Element In-Line Skate Wheel Hub.
3. Outline of boot location with respect to the In-Line Skate wheel frame.
4. In-Line Skate Wheel Frame.
4a. Hard plastic Friction Strip (e.g. Ultra High Molecular Weight) bonded to each inside face of Wheel Frame
4b. Outline of non-germane In-Line Skate Wheel Frame.
4c. Wheel Frame reinforcing spacer.
4d. Vertical Axis.
5. Roller ball Axle Bearings at inner Hub element core of dynamic 2-Element Wheel Hub and at core of radial Self-Aligning Urethane "Springs".
6. $5/16"\pm$O.D. Axle Sleeve Spacer.
7. Internal Retaining Ring.
7a. Radial self-aligning Urethane "Spring" (cast with both a ring at its core and perimeter).
7b. Internal generally curved ring member, self-aligning Urethane "Spring", concentrically located within dynamic 2-Element Wheel Hub.
8. $1/4"\pm$O.D. Axle and Screw Head Caps.
8a. $5/16"\pm$O.D. axle Sleeve End Cap.
8b. $1/4$–$28\pm$Lock Nut.
8c. Horizontal Axle Axis.
9. Roller Ball Axle Bearings at inner Hub element core of 2-Element Wheel Hub.
10. $1/8"\pm$W.$\times 15/16"\pm$O.D. Fixed Radial Friction Disk (center threaded $1/4$–$28\pm$).
10a. Hard plastic friction Friction Strip (e.g. Ultra High Molecular Weight) bonded to Friction Disk's perimeter.
10b. Hard plastic radial Friction Strip (e.g. Ultra High Molecular Weight) bonded to indentation in Outer Hub Element 2.
11. Ski-like "Edging Friction Control" contact surface location.
12. Grade
13. Graphic Scale in Inches.
14. Spherical Bearing Assembly.
14a. Outer Element of Spherical Bearing Assembly.
14b. Inner element of Spherical Bearing Assembly.
15. Equal and opposite Curved Channel Ring Recess concentrically located within and between the Inner and Outer Elements of the Spherical Bearing Assembly.

15a. Void Recess within Outer Element when Spherical Bearing Assembly is in a canting misaligned position.
15b. Void Recess within Inner Element when Spherical Bearing Assembly is in a canting misaligned position.
16. Self-Lubricated Compression Spring (within aligned Curved Channel Recess) in a minimal dynamic compression force state.
16a. Self-Lubricated Compression Spring (within canted misaligned Curved Channel Recess) in a maximum dynamic compression force state.
17. Self-Lubricated, Accordion Pleated Sheet Alloy or Elastomer Compression Spring in a minimal dynamic force state.
17a. Self-Lubricated Alloy or Elastomer Coil Compression Spring in a minimal dynamic force state.
17b. Alloy or rigid Plastic Washer.
18. Bore of Inner Element of Spherical Bearing Assembly.
19. Horizontal Axis of Spherical Bearing Assembly.
20. Vertical Axis of Spherical Bearing Assembly.

DETAILED DESCRIPTION OF THE INVENTION

To understand the improvement to the present invention and the two variation means of braking and control (wheel to frame) and (self-contained wheel assembly), a comparison to the state of the art components of a typical In-Line Skate Wheel, having a single element, monolithic Hub versus the invention's dynamic 2-Element In-Line Skate Wheel Hub; would seem to be appropriate.

Accordingly, FIG. 1A is a combined translucent and sectional perspective view illustrating the component parts of a typical state of the art In-Line Skate wheel, having a neoprene tire 1 with reinforcing Rim 1e both bonded to single element Wheel Hub 1a with wheel spokes 1b attached to fixed Wheel Hub Core 1c; wherein there is a raised Section Spacer 1d, centered in Core 1c between two axle bearings (not indicated).

FIG. 1B is an isolated perspective illustration of just the typical state of the art, hard plastic, monolithic (single rigid element) In-Line Skate Wheel Hub 1a comprised of: Tire Reinforcing Rim 1e; Wheel Hub Spokes 1b; Hub Core 1c; and, Raised Shoulder Spacer 1d centered between axle bearings (not indicated).

FIG. 1C is a perspective view in accordance with the invention of preferably hard plastic Inner Hub Element 2a of a dynamic 2-Element In-Line Skate Wheel Hub, having Core 2b with centered Raised Spacer 2c between axle bearings (not indicated) and Convex Perimeter surface 2d.

FIG. 1D is a perspective view in accordance with the invention of preferably hard plastic Outer Wheel Hub Element 2 of a dynamic 2-Element In-Line Skate Wheel Hub, having a Concave Core 2e, into which opening is convex Inner Element 2a (wherein the Outer concave Hub Element 2 and the inner convex Hub Element 2a function as a spherical bearing structure). The inner and outer hub elements, as such, constitute being a dynamic 2-Element In-Line Skate Wheel Hub that has a typical Reinforcing Rim 2f and Wheel Hub Spokes 2g.

FIG. 2A is a cross section view (drawn to a graphic scale 12 in inches) in accordance with the invention (interactive wheel to frame variation solution) comprising in part: an outline of non-germane boot 3; Wheel Frame 4; preferably hard plastic (ultra high molecular weight) Friction Strips 4a; Tire or roller member 1 (in a vertical coasting position); tire Reinforcing Rim 2f; and Wheel Hub Spokes 2g. As shown, the hard plastic 2-Element dynamic Wheel Hub consists of Outer Hub Element 2 with Concave Core 2e (indicated in FIG. 1D) and Inner Hub Element 2a with convex perimeter surface 2d (indicated in FIG. 1C) such that the inner captivated Hub Element 2a can rotate in any direction (the inner and outer hub elements, as such, constitute being a spherical bearing structure). Radial self-aligning elastomer, generally disk-shaped (replaceable) "Springs" 7a are on opposite sides of the wheel, each fitting into a radial recessed notch of Outer Hub Element 2 and kept in position by internal retaining rings 7. The elastomer "spring" can be any suitable elastomer, such as urethane. Since tension and compressive forces on "springs" 7a are equal and opposite to each other, the wheels are kept in a vertical coasting position with respect to vertical axis 4d. At the cores of Springs 7a are axle bearings 5 in Core 2b of Inner Hub Element 2a are same size axle bearings 5, separated by raised integral Section Spacer 2c (as seen in FIG. 1C). At the ends of axle 8 within Wheel Frame 4 are force fit sleeve end caps 8a for ease of wheel assembly installation into Wheel Frame 4.

FIG. 2B is the same cross section view of FIG. 2A, except that the wheel is at an angle with respect to vertical axis 4d (or in ski term parlance, "canted") EDGING FRICTION CONTROL™ position, wherein Tire 1 is in Friction Edging Contact 11 with Friction member Strip 4b. The novel operational reason that it is possible to be able to cant the wheel, is due in kind to the same novel workings of the dynamic 2-Element In-Line Skate Wheel Hub that functions as a spherical bearing structure. Further, for this novel canted feature to function as it does in skiing, when the canted "edging" force (applied by the skater) is released, the opposite and equal pressure on the self-aligning elastomer "springs" 7a (on each side of Outer Hub Element 2), forces the canted friction edging wheel back into the vertical coasting position.

FIG. 3A is a cross section view (drawn to a graphic scale in inches) in accordance with the invention (variation solution—self-contained wheel assembly) comprising in part: an outline of non-germane boot 3 and skate frame 4a; urethane Tire 1 (in a vertical coasting position); tire Reinforcing Rim 2f; and, Wheel Hub Spokes 2g. As shown, the preferably hard plastic 2-Element dynamic Wheel Hub consists of Outer Hub Element 2 with concave Core 2e (indicated in FIG. 1D) and Inner Hub Element 2a with convex perimeter surface 2d (indicated in FIG. 1C) such that the inner captivated Hub Element 2a can rotate in any direction (functioning as a spherical bearing structure). Centered between and within the interior concave and convex surfaces of the 2-Element Hub, there is an evenly split circular channel shaped void. Within that circular, curved rectilinear shaped void space there is an elastomer self-aligning "spring" 7b, preferably of urethane material. Additionally, a preferably hard plastic radial Friction Structure Strip 10b is notched in and bonded to Outer Hub Element 2's recessed perimeter. A comparable interactive, hard plastic radial Friction member or Strip 10a is bonded to Friction Disk 10, which is threaded onto axle 8 against Sleeve Spacer 6 and axle bearing 9 within Core 2b (as indicated in FIG. 1C) of Inner Hub Element 2a. The axle assembly is secured at each end by threaded lock nut 8a.

FIG. 3B is the same cross section view of FIG. 3A, except that the wheel is at an angle (or in ski term parlance, "canted") EDGING FRICTION CONTROL™ position wherein the wheel's Outer Hub Element 2's radial Friction Strip 10b contacts radial Friction Strip 10a bonded to the perimeter of Friction Disk 10. This EDGING FRICTION™ Contact 11 occurs not only at the top of Friction Disk 10 on one side of the wheel, but simultaneously at the bottom of Friction Disk 10 on the opposite side of the wheel. When the canted "edging" force (applied by the skater) is released, the self-aligning Urethane "Spring" 7b, within and between the dynamic 2-Element In-Line Skate Wheel Hub, forces the canted friction edging wheel back into the vertical coasting position.

FIG. 4A is a longitudinal section view of FIG. 2A in accordance with the invention (drawn to a graphic scale 13 in inches) wherein all the identifiable components are identical to those identified in FIG. 2A and wherein the wheel 1 is displayed in the vertical coasting position.

FIG. 4B is a plan cross section view of FIG. 4A in accordance with the invention (drawn to a graphic scale 13 in inches), wherein all the identified components are identical to those in FIGS. 2A and 4B.

FIG. 5A is a longitudinal section view of FIG. 3A in accordance with the invention (drawn to a graphic scale 13 in inches) wherein all the identifiable components are identical to those identified in FIG. 3A and wherein the wheel 1 is displayed in the vertical coasting position.

FIG. 5B is a plan cross section view of FIG. 5A in accordance with the invention (drawn to a graphic scale 13 in inches), wherein all the identified components are identical to those in FIGS. 3A and 5B.

FIG. 6A is a cross section view of novel spherical bearing 14 in accordance with the invention, wherein there is an Internal Self-Aligning Compression Spring 16 concentrically located within equally split channel recess 15, half within the spherical bearing's outer ring element 14a and half within the bearing's inner ring element 14b. As shown, the inner ring element 14b and outer ring element 14a of the spherical bearing are in a vertically aligned axis equilibrium position, wherein compression spring 16 is in a minimal dynamic force state. Indicated as well is core 18 of inner element 14b, horizontal axis 19 and vertical axis 20.

FIG. 6B is the same cross section view of FIG. 6A, except that outer ring element 14a and inner ring element 14b are in a canted misaligned position, wherein Self-Aligning Compression Spring 16a is in a maximum compressive force state. When in that compressed state there is a void space 15a within outer element 14a and a void space 15b within inner element 14b.

FIG. 6C is a longitudinal section view of FIG. 6B displaying outer element 14a, inner element 14b, split channeled recess space 15 for compression spring 16, core 18 of inner element 14b, horizontal axis 19 and vertical axis 20. Indicated as well by the dashed line is void space 15a within outer element ring 14a and void space 15b within inner element 14b, when spherical bearing 14 is in a canted misaligned position and Self-Aligning Spring 16 is in a maximum compressive force state.

FIG. 6D is a perspective view of Self-Aligning Accordion Pleated alloy or elastomer compression Spring 17 in a minimal dynamic force state. Dashed lines indicate outer ring element 14a and inner ring element 14b. Indicated as well is core 18 and horizontal axis 19.

FIG. 6E is a perspective view of Self-Aligning wire or elastomer Coil compression Spring 17a, in a minimal dynamic force state. Dashed lines indicate outer ring element 14a, and inner ring element 14b. Indicated as well is core 18 and horizontal axis 19.

Advantages

The distinct advantages of an all inclusive 2-element plastic hub (without the need of a separate spherical bearing entity in the core of the inventive dynamic in-line skate wheel hub) is simplicity and cost effectiveness. Once a mold is made for an all inclusive homogeneous plastic, dynamic 2-element hub; as compared to the single element state of the art hub, the added cost of the 2-element spherical bearing structured hub would (in production quantities) be minimal.

In addition, after going through the extensive process of fabricating and testing the prototype in-line skates it became apparent that urethane was in fact the ideal material for the self-aligning replaceable "springs". Aside from being an indefatigable material, its durometer can be incrementally varied from soft (for a beginner) to hard (for an expert) or in any customized interchangeable combination thereof with respect to gender, age and capability for a four or five wheel in-line skate.

In stark contrast, state of the art in-line skates can not be functionally customized with respect to braking and control functions for a beginner to an expert. Other than the quality of the: boot; frame; wheels; and, axle bearing tolerance ratings (ABEC); there is no essential difference in braking or control from one quality pair of in-line skates to the other.

There is another significant advantage that should be mentioned. While the interactive wheel to frame variation solution was chosen to make and successfully test the prototype skates for non-production, cost effective reasons; the self-contained wheel assembly solution has an intriguing sophisticated advantage.

In the interactive wheel to frame solution the edging friction control contact location for each skate is at the top of the right or left side of the canted wheel, coming in contact with the left or right friction strip inside the wheel frame—one top side contact location at a time.

Whereas, in the self-contained wheel assembly variation solution there are two equal contact locations for each skate. One friction contact location is at the top of the friction disk on one side of the wheel and the other is at the bottom of the friction disk on the the opposite side of the wheel—both edging friction control contacts occurring simultaneously. This latter more sophisticated solution could be considered as a second generation featured In-Line Skate.

Concluding Comments

In summation, the in-line skate invention operates by a simplified means that allows the wheels to cant relative to their fixed horizontal axles. When the skater applies side pressure, as a skier does when edging skis, the canted wheels contact a friction strip inside the wheel frame (wheel to frame solution) or radial friction strips within the wheel assembly (independent wheel assembly solution), thus slowing the skates. The greater the side pressure, the greater the stopping power.

To slow down or stop, the skater assumes a basic "snow plow" position or a simulated "hockey stop" for more advanced skaters. This ski-like control is achieved without having to awkwardly lean back to engage a heel brake pad in an unstable accident prone position.

In brief the novel advantages of the invention are:

1. Effective braking is achieved naturally by applying equal force to both skates;
2. Easily adapts to gender, age and capability;
3. Improves skating for beginners and pros alike;
4. Enhanced control minimizes accidents and injuries.
5. Sharper, safer turns are great for slalom and hockey; and,
6. Interchangeable urethane "spring" components provide for after market manufacturer sales.

Finally, the braking and control invention has been achieved using state of the art dimensioned wheels as well as maintaining a state of the art inside face to face dimension within the wheel frame.

While the invention and its alternate variation solution (wheel to frame and self-contained wheel assembly) have been particularly shown and described with reference to preferred embodiments thereof, it will be understood by those in the art that the foregoing and other changes in form and details may be made therein without departing from the spirit and scope of the invention. For example, the wheels described are not limited for use with in-line skates, in-line skateboards, downhill in-line skis, and downhill in-line skateboards, but may be used whenever both vertical and inclined self-aligning rotation is required around an axle. On that basis the following claims have been predicated.

What is claimed is:

1. A wheel assembly comprising:
    at least one wheel member,
    roller bearing structure permitting the wheel member to rotate about an axle with respect to a vertical axis,
    canting structure constructed and arranged to permit the wheel member to rotate about the axle at an angle with respect to the vertical axis, and
    elastomer structure constructed and arranged to bias the wheel member in opposing directions towards the vertical axis.

2. The wheel assembly of claim 1, wherein the canting structure is a wheel hub component comprised of an outer hub element and an inner hub element, the inner hub element being received in a bore of the outer hub element such that the inner hub element rotates about an axle with respect to the vertical axis.

3. The wheel assembly of claim 2, wherein the roller bearing structure includes at least one roller ball bearing in a bore of the inner hub element.

4. The wheel assembly of claim 2, wherein each of the inner and outer hub elements of the canting structure is composed of plastic.

5. The wheel assembly of claim 4, wherein the wheel member is disposed about the outer hub element.

6. The wheel assembly of claim 1, wherein the elastomer spring structure comprises a first member disposed on one side of the vertical axis and a second elastomer member disposed the other side of the vertical axis.

7. The wheel assembly of claim 6, wherein each of the first and second elastomer members is a urethane disk.

8. The wheel assembly of claim 1, wherein the wheel member has an axle axis transverse with respect to the vertical axis, and the elastomer spring structure comprises a generally circular member disposed about the vertical axis.

9. The wheel assembly of claim 8, wherein the generally circular spring structure is a urethane member.

10. The wheel assembly of claim 1, wherein the wheel member is configured for use as one of a wheel for an in-line skate, a downhill in-line ski and a downhill in-line skateboard.

11. The wheel assembly of claim 6, in combination with an in-line skate having an axle, the wheel assembly being coupled to the axle for rotation thereabout via the roller bearing structure, the wheel assembly being disposed within a wheel frame of the in-line skate, the skate wheel frame having friction members operatively associated with wheel member, such that when the wheel member rotates at a certain angle with respect to the vertical axis, a portion of the wheel member contacts a friction member within the skate wheel frame to cause slowing down and braking of the wheel member and wherein the angled wheel member is forced back to the vertical axis by said elastomer spring structure.

12. The wheel assembly of claim 8, in combination with an in-line roller skate having an axle, the wheel assembly being coupled to the axle for rotation thereabout via the roller bearing structure, wherein friction members are fixed to the axle and friction structure of the wheel assembly is associated with the friction members, such that when the wheel member rotates at a certain angle with respect to the vertical axis, a friction structure contacts a friction member to cause slowing down and braking of the wheel member.

13. A wheel assembly comprising:
    at least one wheel member,
    roller bearing structure permitting the wheel member to rotate about an axle with respect to a vertical axis,
    canting structure constructed and arranged to permit the wheel member to rotate about the axle at an angle with respect to the vertical axis, and
    elastomer spring structure constructed and arranged within canting structure to bias the wheel member in opposing directions towards the vertical axis.

14. The wheel assembly of claim 13, wherein the canting structure is a wheel hub component comprised of an outer hub element and an inner hub element, the inner hub element being received in a bore of the outer hub element such that the inner hub element rotates with respect to the vertical axis and wherein said elastomer spring is a ring member within a channeled recess that is centered and between said outer and inner hub elements.

15. The wheel assembly of claim 14, wherein the ring member is a urethane ring member.

16. The wheel assembly of claim 14, wherein the roller bearing structure includes at least one roller ball bearing in a bore of the inner hub element.

17. The wheel assembly of claim 14, wherein each of the inner and outer hub elements of the canting structure is composed of plastic.

18. The wheel assembly of claim 13, wherein the wheel member is disposed about the outer hub element.

19. The wheel assembly of claim 14, being coupled to the axle for rotation thereabout via the canting structured hub, wherein fixed friction disk structure is provided and comprise a first fixed friction disk disposed on one side of the vertical axis and on the axle and a second fixed friction disk disposed on the other side of the vertical axis and on the axle and wherein the outer hub element of the wheel assembly is associated with said friction disks, such that when the wheel member rotates at a certain angle with respect to the vertical axis, the outer hub element contacts a fixed friction disk at the top of the disk on one side of the vertical axis, and said outer hub element simultaneously contacts the bottom side of a fixed friction disk disposed the other side of the vertical axis to cause slowing down and braking of the wheel member and wherein the angled roller member is forced back to the vertical axis by said ring member within the inner and outer hub elements of the canting structure.

20. The wheel assembly of claim 14, wherein the outer hub element has a friction rim element bonded onto the surface of its core at each underside end.

21. The wheel assembly of claim 19, wherein each said fixed friction disk has a friction surface element bonded to its perimeter.

22. The wheel assembly of claim 19, wherein the wheel member is configured for use as a wheel for an in-line skate, a downhill in-line ski and a downhill in-line skateboard.

23. A spherical bearing assembly comprising:

an outer element defining a vertical axis and having a bore there-through, an inner element mounted in the bore of the outer element to permit inclined rotation of the inner element with respect to the vertical axis, and spring structure constructed and arranged to bias the inner element towards the vertical axis.

24. The bearing assembly of claim 23, wherein each of the outer and inner elements are composed of plastic.

25. The bearing assembly of claim 23, wherein each of the outer and inner elements are composed of metal.

26. The spherical bearing assembly of claim 23, wherein the spring structure is a generally curved elastomer ring member concentrically located within and between said outer and inner elements.

27. The spherical bearing assembly of claim 23, wherein the spring structure is a multiple coil member composed of metal.

28. The spherical bearing assembly of claim 27, wherein the spring structure is an elastomer multiple coil member.

29. The spherical bearing assembly of claim 23, wherein the spring structure is an accordion pleated elastomer member.

30. The spherical bearing assembly of claim 29, wherein the accordion pleated elastomer member is reinforced by an integral coil member.

31. A wheel assembly comprising:

at least one wheel member, roller bearing structure permitting the wheel member to rotate about an axle with respect to a vertical axis, canting structure constructed and arranged to permit the wheel member to rotate about the axle at an angle with respect to the vertical axis, and biasing structure constructed and arranged to bias the wheel member in opposing directions towards the vertical axis.

* * * * *

UNITED STATES PATENT AND TRADEMARK OFFICE
CERTIFICATE OF CORRECTION

| | | |
|---|---|---|
| PATENT NO. | : 7,108,331 B2 | Page 1 of 4 |
| APPLICATION NO. | : 11/043189 | |
| DATED | : September 19, 2006 | |
| INVENTOR(S) | : Myron Stuart Hurwitz | |

It is certified that error appears in the above-identified patent and that said Letters Patent is hereby corrected as shown below:

THE TILTE PAGE, SHOWING AN ILLUSTRATIVE FIGURE, SHOULD BE DELETED AND SUBSTITUTE THEREFOR THE ATTACHED TITLE PAGE.

DELTE DRAWING SHEETS 1, AND SUBSTITUTE THEREFOR THE DRWAING SHEETS CONSISTIN OF FIG 1a- 1d AS SHOWN ON THE ATTACHED PAGES.

Column 1.

Line 12, delete "200" and insert -- 2000 --

Line 26, delete "(", first occurance and insert -- , --

Column 3.

Line 41, delete "al" and insert -- a --

Column 4.

Line 34, delete "core" and insert -- Core --

Line 35, delete "core" and insert -- Core --

Column 5.

Line 66, delete " . " second occurance and insert -- , --

UNITED STATES PATENT AND TRADEMARK OFFICE
CERTIFICATE OF CORRECTION

PATENT NO. : 7,108,331 B2
APPLICATION NO. : 11/043189
DATED : September 19, 2006
INVENTOR(S) : Myron Stuart Hurwitz It is certified that error appears in the above-identified patent and that said Letters Patent is hereby corrected as shown below:

<u>Column 6.</u>

Line 15, delete "2*bo*f" and insert -- 2b of --

Signed and Sealed this

Thirteenth Day of March, 2007

JON W. DUDAS
*Director of the United States Patent and Trademark Office*

(12) United States Patent
Hurwitz

(10) Patent No.: US 7,108,331 B2
(45) Date of Patent: *Sep. 19, 2006

(54) GENERATION OF IN-LINE SKATES AND SKATE-BOARDS WITH SAFETY "EDGING FRICTION CONTROL™"

(76) Inventor: Myron Stuart Hurwitz, 4420 Forest Glen Ct., Annandale, VA (US) 22003

( * ) Notice: Subject to any disclaimer, the term of this patent is extended or adjusted under 35 U.S.C. 154(b) by 0 days.

This patent is subject to a terminal disclaimer.

(21) Appl. No.: 11/043,189

(22) Filed: Jan. 27, 2005

(65) Prior Publication Data
US 2005/0146100 A1 Jul. 7, 2005

Related U.S. Application Data

(60) Continuation-in-part of application No. 10/462,631, filed on Jun. 17, 2003, now Pat. No. 6,848,750, and a division of application No. 09/782,079, filed on Feb. 14, 2001, now Pat. No. 6,637,827.

(60) Provisional application No. 60/564,217, filed on Apr. 22, 2004, provisional application No. 60/194,013, filed on Apr. 3, 2000, provisional application No. 60/185,496, filed on Feb. 28, 2000.

(51) Int. Cl.
*B60B 9/00* (2006.01)
*A63C 17/22* (2006.01)

(52) U.S. Cl. .................... 301/5.301; 301/5.304; 152/40; 152/87

(58) Field of Classification Search ......... 301/5.301, 301/5.304, 5.305, 5.7; 152/17, 40, 87; 384/495, 384/496, 497, 498; 280/11.221, 11.223, 280/11.226, 11.204, 11.207, 11.208, 11.224; 188/29, 68, 74

See application file for complete search history.

(56) References Cited

U.S. PATENT DOCUMENTS

| | | | |
|---|---|---|---|
| 1,009,586 A | 11/1911 | Schmidt | |
| 1,430,319 A | 9/1922 | Parker | |
| 1,851,561 A * | 3/1932 | Baulnger | 384/535 |
| 2,141,122 A * | 12/1938 | Boden | 384/582 |
| 2,266,042 A * | 12/1941 | Hofferd et al. | 16/223 |
| 2,467,437 A * | 4/1949 | Martinec | 301/5.7 |
| 2,670,242 A * | 2/1954 | Maafild | 301/5.7 |
| 2,689,769 A | 9/1954 | Ware, Jr. | |
| 2,935,357 A | 5/1960 | Sutowski | |
| 3,224,821 A | 12/1965 | Barr | |

(Continued)

*Primary Examiner*—Russell D. Stormer

(57) ABSTRACT

The invention discloses a technology to safely control speed and brake on in-line skates using a ski-like technique, wherein in-line skate wheels can rotate both vertically and at an angle. When angled (or "canted") the wheels contact a friction strip within the wheel frame or a friction disk on the axle. The friction caused by the angled wheels contacting friction strips or friction disks is comparable to the canted "edging friction control" action of skis. The novel means that allows both vertical and angular rotation is a cohesive 2-element plastic hub shown in FIG's 1–C & D. The inner element 2a has a convex perimeter and fits inside outer element 2's convex bore, allowing 2a to rotate freely within outer element 2. Within inner element 2a are axle bearings 5 or 9 and axle 8. External elastomer springs 7a or internal elastomer spring 7b keep each wheel in a vertical coasting position. When in the canting (edging) position for control and braking, the self-aligning "springs" (7a or 7b) force the canted wheels back into the vertical coasting (gliding) position. Since the self-aligning elastomer "springs" can be made soft to hard and be interchangeably arranged, the skates can effectively have models that would satisfy a beginner to a pro.

31 Claims, 6 Drawing Sheets

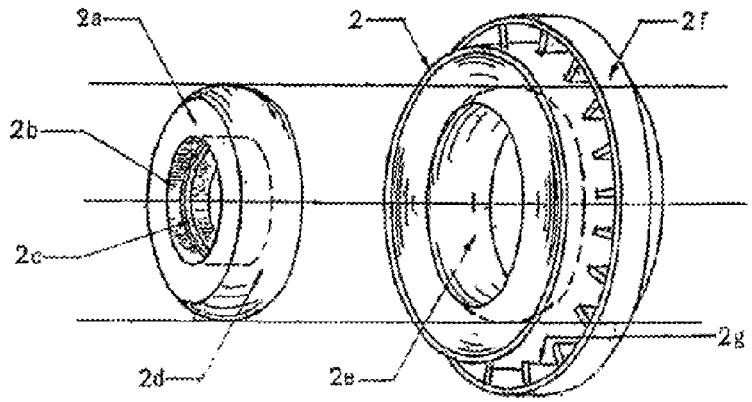

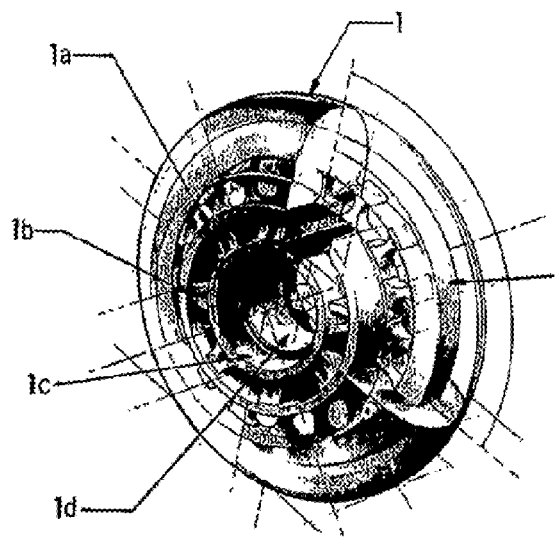
FIG. 1A
(PRIOR ART)
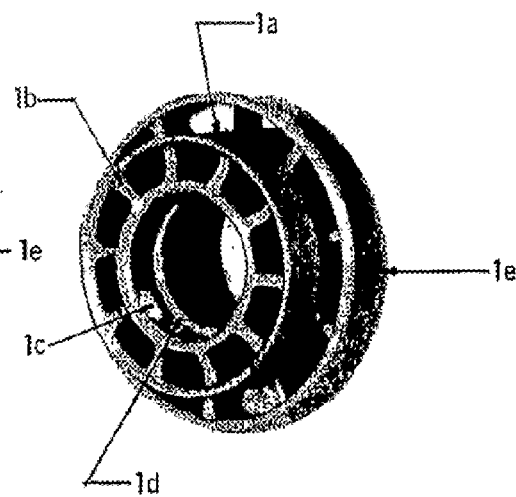
FIG. 1B
(PRIOR ART)
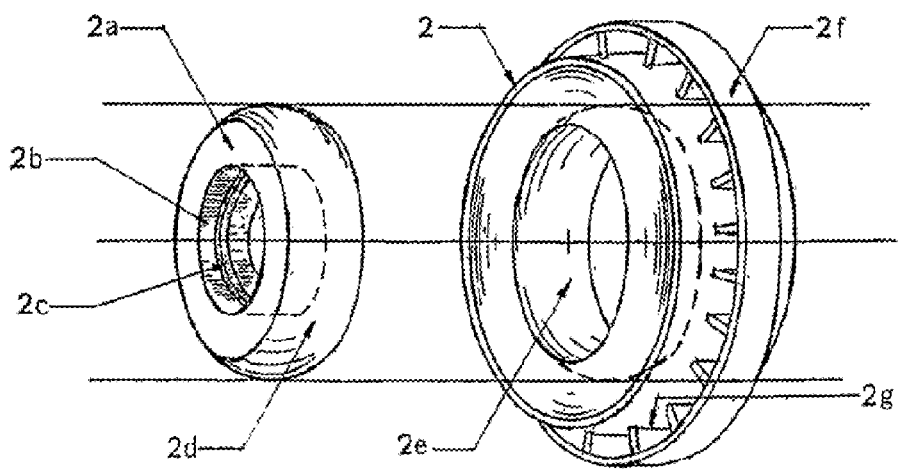
FIG. 1C     FIG. 1D